United States Patent
Efimov et al.

(10) Patent No.: US 9,945,731 B1
(45) Date of Patent: Apr. 17, 2018

(54) OPTICAL DETECTOR FOR MEASURING RESPECTIVE PHASES OF MULTIPLE BEAMS APPARATUS AND METHOD

(71) Applicants: HRL LABORATORIES LLC, Malibu, CA (US); HRL LABORATORIES LLC, Malibu, CA (US)

(72) Inventors: Oleg M. Efimov, Thousand Oaks, CA (US); Keyvan R. Sayyah, Santa Monica, CA (US)

(73) Assignee: HRL Laboratories, LLC, Malibu, CA (US)

( * ) Notice: Subject to any disclaimer, the term of this patent is extended or adjusted under 35 U.S.C. 154(b) by 369 days.

(21) Appl. No.: 14/596,825

(22) Filed: Jan. 14, 2015

(51) Int. Cl.
*G01B 9/02* (2006.01)
*G01J 9/02* (2006.01)

(52) U.S. Cl.
CPC ......... *G01J 9/02* (2013.01); *G01J 2009/0203* (2013.01)

(58) Field of Classification Search
CPC .... G01J 3/0229; G01J 9/02; G01J 2009/0203; G01J 2009/0234; G01J 2009/0238; G01J 2009/0249; G01J 2009/0211; H01S 3/06754; H01S 3/10007; H01S 3/1301; H01S 3/1307; H01S 3/2383
See application file for complete search history.

(56) References Cited

U.S. PATENT DOCUMENTS

| | | | |
|---|---|---|---|
| 5,071,251 A | 12/1991 | Hochberg et al. | |
| 5,216,541 A * | 6/1993 | Takesue | G06E 3/005 359/559 |
| 5,307,073 A | 4/1994 | Riza | |
| 5,387,972 A * | 2/1995 | Janz | G01J 9/02 356/477 |
| 6,219,187 B1 | 4/2001 | Hwu et al. | |
| 7,058,098 B1 | 6/2006 | Shay | |
| 7,336,363 B2 * | 2/2008 | Rothenberg | B23K 26/0613 356/450 |

(Continued)

OTHER PUBLICATIONS

U.S. Appl. No. 14/596,960, filed Jan. 14, 2015, Efimov, et al.

(Continued)

*Primary Examiner* — Michael A Lyons
(74) *Attorney, Agent, or Firm* — Ladas & Parry

(57) ABSTRACT

A system includes a source of laser beams forming an array, a source of a reference laser beam, and an optical detector for measuring respective phase differences between the array laser beams and the reference laser beam. The system includes a mask, having apertures with a shape, size and position identical to a shape, size and position of the array laser beams, and positioned in the reference laser beam to form respective beams of the reference laser beam corresponding to the beams from the array laser beams. A phase modulator phase modulates respective beams of one of (a) the array laser beams and (b) the beams of the reference laser from the mask. A photodetector receives the respective array laser beams and the corresponding reference laser beams from the mask to generate a composite signal. Processing circuitry is responsive to the composite signal for generating respective signals representing the phase differences of the individual laser beams from the reference laser beam.

40 Claims, 5 Drawing Sheets

(56) References Cited

U.S. PATENT DOCUMENTS

| | | | |
|---|---|---|---|
| 7,440,174 B2* | 10/2008 | Rice | H01S 3/005 356/477 |
| 7,499,174 B2 | 3/2009 | Farah | |
| 7,848,370 B2 | 12/2010 | Kewitsch et al. | |
| 7,995,630 B2 | 8/2011 | Rakuljic | |
| 8,792,099 B1 | 7/2014 | Efimov | |
| 2003/0002790 A1* | 1/2003 | Johnson | G02B 27/0087 385/33 |
| 2005/0201429 A1* | 9/2005 | Rice | B23K 26/0604 372/27 |
| 2006/0222372 A1 | 10/2006 | Spinelli et al. | |
| 2008/0285031 A1* | 11/2008 | Bowlan | G01J 9/02 356/326 |
| 2009/0245306 A1 | 10/2009 | Rakuljic | |
| 2009/0279828 A1 | 11/2009 | Nilsson et al. | |
| 2009/0296751 A1 | 12/2009 | Kewitsch et al. | |
| 2011/0150504 A1 | 6/2011 | Ellis et al. | |
| 2011/0200334 A1 | 8/2011 | Wu et al. | |
| 2011/0235049 A1 | 9/2011 | Burnett et al. | |
| 2012/0063474 A1 | 3/2012 | Ayotte et al. | |
| 2013/0308663 A1 | 11/2013 | Chen et al. | |
| 2013/0315271 A1 | 11/2013 | Goodno | |
| 2015/0138618 A1* | 5/2015 | Hamamoto | G01J 9/02 359/239 |

OTHER PUBLICATIONS

Requirement for Restriction for U.S. Appl. No. 14/596,960 (currently unpublished) dated Jan. 11, 2017.

Notice of Allowance issued for U.S. Appl. No. 13/332,939(now U.S. Pat. No. 8,792,099) dated Mar. 21, 2014.

T.Y. Fan, "Laser Beam Combining for High-Power, High-Radiance Sources", *IEEE J. of Selected Topics in Quan. Elect.*, vol. 11, No. 3, May/Jun. 2005, pp. 567-577.

Kenneth Li, "Etendue efficient coupling of light using dual paraboloid reflectors for projection displays," *Proc. of SPIE*, 4657, 1 (2002), pp. 1-8.

T. R. O'Meara, "Stability of an N-loop ensemble-reference phase control system," J. *Opt. Soc. Am.* 67, 315, (1977), pp. 315-318.

L. Liu, et al., "Phase-Locking of Tiled Fiber Array using SPGD Feedback Controller", Proc. SPIE 5895-5895OP-1(2005), pp. 1-9 (all pages within attached document).

H.L. Stover, W.H. Steier, "Locking of Laser Oscillators by Light Injection,", Applied Physics Letters, vol. 8, No. 4, pp. 91-93, Feb. 15, 1966.

T.R. O'Meara,"The Multidither Principle in Adaptive Optics", Journal of the Optical Society of America, vol. 67, Issue 3, pp. 306-315, Mar. 1977.

G.W. Johnson et al.," Phase-locked Interferometry," Optical Engineering, vol. 18, No. 1, pp. 46-52, Jan.-Feb. 1979.

T.M. Shay,"Theory of Electronically Phase Coherent Beam Combination Without a Reference Beam," Optics Express, vol. 14, Issue 25, pp. 12188-12195, Dec. 11, 2006.

S.D. Lau et al., "Optical Phase Difference Measurement and Correction Using AlGaAs Integrated Guided-Wave Components," IEEE Photonics Technology Letters, vol. 3, No. 10, Oct. 1991, pp. 902-904.

B. Golubovic et al., Basic Module for An Integrated Optical Phase Difference Measurement and Correction System,: IEEE Photonics Technolgy Letters, vol. 7, No. 6, pp. 649-651, Jun. 1995.

Non-final Rejection for U.S. Appl. No. 14/596,960 (currently unpublished) dated Jun. 14, 2017.

\* cited by examiner

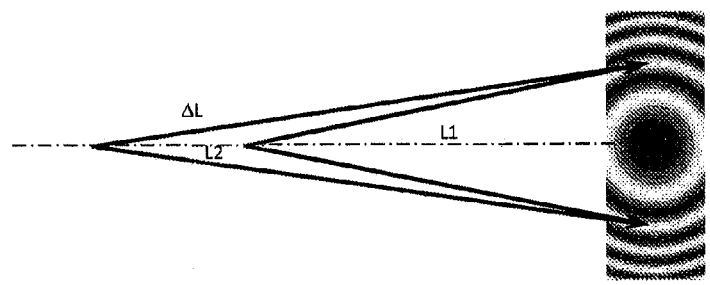
Fig. 1
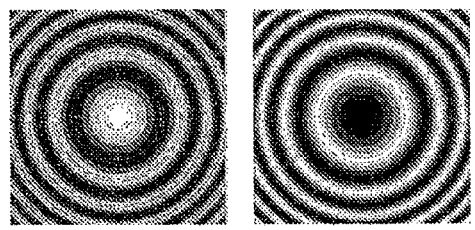
ΔL=20 mm, Δϕ=0
Fig. 2A
ΔL=20 mm, Δϕ=π
Fig. 2B
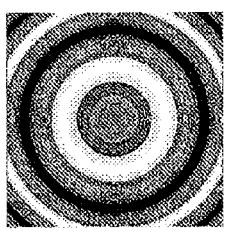 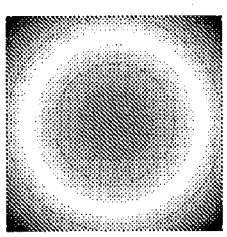 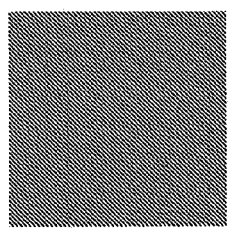 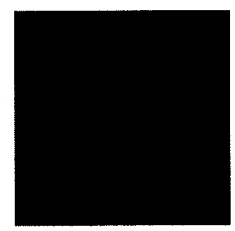
ΔL=6 mm, Δϕ=π/2
Fig. 2C
ΔL=2 mm, Δϕ=π/2
Fig. 2D
ΔL=0 mm, Δϕ=π/2
Fig. 2E
ΔL=0 mm, Δϕ=π
Fig. 2F

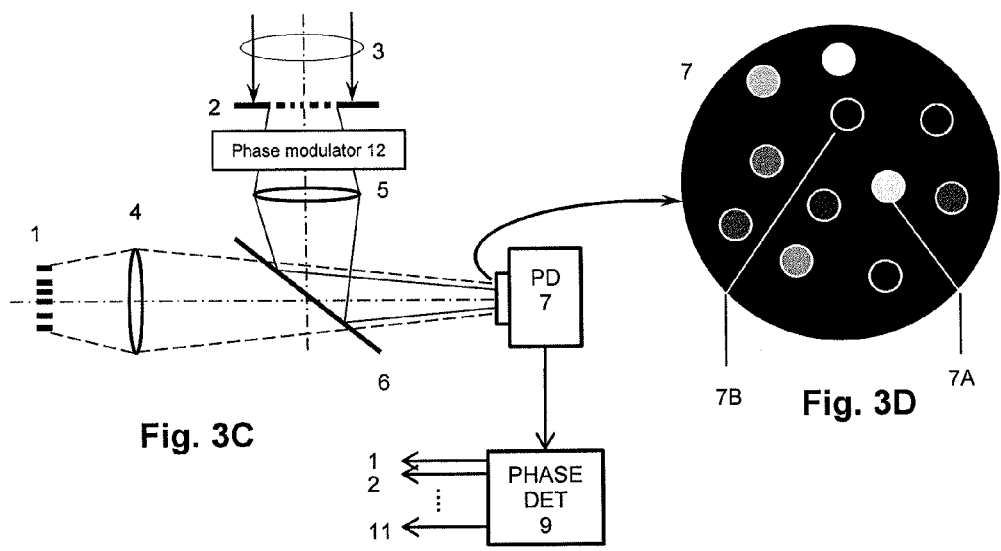
Fig. 3C
Fig. 3D
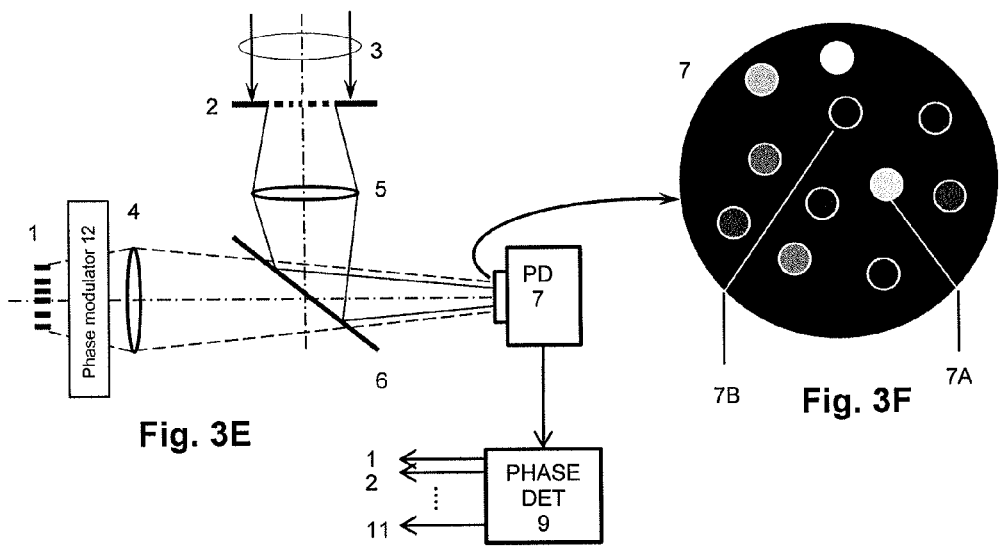
Fig. 3E
Fig. 3F

OPTICAL DETECTOR FOR MEASURING RESPECTIVE PHASES OF MULTIPLE BEAMS APPARATUS AND METHOD

STATEMENT REGARDING FEDERALLY SPONSORED RESEARCH OR DEVELOPMENT

This invention was made with Government support under Contract No. HR0011-10-C-0150 awarded by DARPA. The Government has certain rights in the invention.

CROSS-REFERENCE TO RELATED APPLICATIONS

The present application is related to U.S. patent application Ser. No. 14/596,960 filed on Jan. 14, 2015 for a "System for Maintaining the Locking Range of an Injection Locked Laser Array Within Range of the Frequency of a Master Laser" by Efimov et al.

BACKGROUND OF THE INVENTION

Field of the Invention

The present invention relates to non-mechanical beam steering of laser arrays by electronically controlling the phases of the lasers in the array. More specifically, the present invention relates to an optical phase detector which may be used in such beam steering systems.

Discussion of the Prior Art

Two waves are coherent if they have a constant phase difference and fixed frequency or wavelength. It is a property of waves that enables stationary (i.e. temporally and spatially constant) interference patterns to be formed.

It is currently desired to control the direction of the beam produced by a laser array, which is a collection of coherent combined laser beams. In order to provide for non-mechanical beam steering of laser arrays, it is required to accurately control the relative phases of all the lasers in the array. This, in turn, requires that the phases of all the lasers in the array be accurately measured.

Large-sized arrays, i.e. arrays with a large number of beams, require accurate and fast measurements of current beam phases independent of the particular method of steering. Such measurements facilitate agile steering of the main interference lobe of the array by allowing the proper modification of generated beam phases and does not involve any mechanical means. Steering the beam requires calculations of desired phase relations between the respective beams for a required interference lobe direction. Application of these desired phases to the beams, corrected with ongoing current measurements of the actual phases through feedback, permits accurate updates to the phases of the beams in the array. Periodic beam phase measurements of all the respective beams is, thus, required.

In general, it is known to measure the phase of a first beam with respect to a second coherent beam based on a multidithering technique. In this technique, one of the beams is modulated with a relatively small sinusoidal phase modulation at a known frequency with a modulation factor much less than $2\pi$. The image of this beam is combined with the image of the other beam to develop interference images. Phase difference information is derived from the intensities of the interference images and the phase modulation of the beam.

More specifically, the multidithering technique was presented as an adaptive optics technique in 1970s. In this technique, the low-amplitude sinusoidal phase modulations were applied to the beams of a laser array. Then, the signal reflected from a target is measured with a single photodetector. Phase error signals at the fundamental frequencies of the phase modulations are calculated and applied to each beam of array to maximize the intensity of the beam interference pattern on the target. This method provides beam phase locking on target through maximization or minimization of phase error signal to maximize or minimize the intensity of beam interference pattern. However, it cannot be used for calculation of individual beam phases.

The multidithering technique was also used for coherent beam combination of fiber lasers. Again, the multidithering techniques provided beam phase locking, but could not be used for calculation of individual beam phases.

The multidithering technique may be applied to two coherent beams to measure phase difference $\Delta\varphi$ between the beams. If sinusoidal modulation with a modulation factor $\Gamma < \pi$ and a frequency $\omega$ is applied to one of the beams of a two-beam interferometer, the signal $V_{PD}$ from the photodetector used to measure the irradiance of the interference pattern is given by:

$$V_{PD}(t) = \frac{\eta_V}{2}\left[P_s + P_r + 2\sqrt{P_s P_r}\cos(\Delta\phi + \Gamma\sin\omega t)\right] \quad (1)$$

where $P_s$ and $P_r$ are the powers from the signal and reference beams, respectively, and $\eta_V$ is the responsivity of the photodetector. The modulation factor $\Gamma$ is measured as the ratio of $\pi V_L/V_{L\pi}$ where $V_L$ is a voltage or current applied to a laser to change its phase and $V_{L\pi}$ is the voltage or current resulting in a $\pi$-shift of phase.

One skilled in the art understands that the small phase modulation results in small spatial shift of fringes which means that the interference picture as a whole is shifted forth and back continuously. If two or more interference fringes are exposed to the aperture of photodetector, the photodetector signal will become constant because of the identity and periodicity of the fringes. To detect the modulated signal, it is necessary to expose the photodetector with less than one period of the fringes. Thus, the aperture of the photodetector must be smaller, and preferably much smaller than the distance between the adjacent interference fringes (i.e. less than the spatial period of the interference fringes).

Amplitudes of harmonics of a phase modulated signal are proportional to Bessel functions of the first kind and of the same order as the harmonic, and having an argument of the modulation factor. By using a Bessel function expansion for the cosine-sine terms in equation (1), the following expressions for the amplitudes of the first harmonic $A(\omega)$ and second harmonic $A(2\omega)$ may be obtained:

$$V_{PD}(t) = \quad (2)$$
$$\frac{\eta_V}{2}\left[\begin{array}{c} P_s + P_r + 2\sqrt{P_s P_r}\cos\Delta\phi[J_0(\Gamma) + 2J_2(\Gamma)\cos2\omega t + \ldots] - \\ 2\sqrt{P_s P_r}\sin\Delta\phi[2J_1(\Gamma)\sin\omega t + 2J_3\sin3\omega t + \ldots] \end{array}\right]$$

Isolating the terms relating to the amplitudes of the first and second harmonics:

$$A(\omega) = 4\sqrt{P_s P_r}J_1(\Gamma)\sin\Delta\varphi$$

$$A(2\omega) = 4\sqrt{P_s P_r}J_2(\Gamma)\cos\Delta\varphi \quad (3)$$

where $J_n(\Gamma)$ are Bessel functions of the first kind of order n and argument $\Gamma$. Thus, the phase difference between the beams is:

$$\Delta\phi = \tan^{-1}\left[\frac{A(\omega)}{A(2\omega)}\frac{J_2(\Gamma)}{J_1(\Gamma)}\right] \qquad (4)$$

The respective signs of the measured amplitudes $A(\omega)$ and $A(2\omega)$ allow unique determination of the phase difference quadrant.

This method has been used to measure the phase difference between paired waveguides. In other words, one photodetector was required for phase measurement between each of two beams. Consequently, N photodetectors were required to measure N phase differences between N+1 laser beams using this method.

During the last decade attention has concentrated on development of methods for phase locking a large number of lasers. The current concentration in beam steering has reemphasized the importance of calculation of respective phase measurements for all beams in a laser array.

Laser arrays, and especially arrays including a relatively large number N of beams, require accurate and fast measurements of the phases of all the beams in the array, independent of the method used for steering that array. Therefore, the development of techniques for phase measurements for large-sized arrays, while minimizing the cost and maximizing the reliability, is important and desirable.

BRIEF SUMMARY OF THE INVENTION

In accordance with principles of the present invention, a system includes a source of laser beams forming an array, a source of a reference laser beam, and an optical detector for measuring respective phase differences between the array laser beams and the reference laser beam. The system includes a mask, having apertures with a shape, size and position identical to a shape, size and position of the array laser beams, and positioned in the reference laser beam to form respective beams of the reference laser beam corresponding to the beams from the array laser beams. A phase modulator phase modulates respective beams of one of (a) the array laser beams and (b) the beams of the reference laser from the mask. A photodetector receives the respective array laser beams and the corresponding reference laser beams from the mask to generate a composite signal. Processing circuitry is responsive to the composite signal for generating respective signals representing the phase differences of the individual laser beams from the reference laser beam.

A system according to principles of the present invention provides fast and reliable phase calculations for a relatively large number of laser beams from the signal of a single photodetector. The application of the mask in the reference beam results in the absence of photodetector exposure to images outside of the 0-fringe points-of-interest, which means that only useful signals illuminate the photodetector. In addition the overlapping of array images with the mask images provides high efficiency interference images of every laser beam with its "own" reference beam and excludes any crosstalk between the beams. Finally, the 0-fringe interference of beams completely transfers the phase modulations in the time domain minimizing the DC offsets of interfering signals and maximizing the number of beam phases measurable with one photodetector.

BRIEF DESCRIPTION OF THE DRAWINGS

FIG. 1 is a diagram illustrating the formation of an interference pattern useful in understanding the operation of the present invention;

FIG. 2A through FIG. 2F are diagrams of six interference patterns useful in understanding the operation of the present invention;

FIG. 3C is the same as FIG. 3A, except FIG. 3C includes a phase modulator;

FIG. 3D is the same as FIG. 3B.

FIG. 3E is the same as FIG. 3A, except includes a phase modulator;

FIG. 3F is the same as FIG. 3B.

DETAILED DESCRIPTION OF THE INVENTION

Figures 3A, 3B:
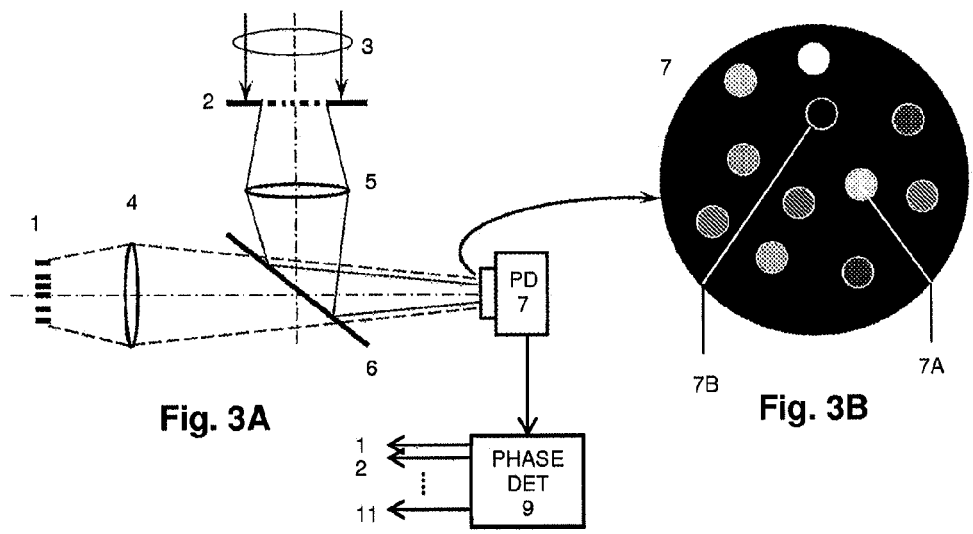
FIG. 3A is a block diagram of one embodiment of a system according to principles of the present invention and FIG. 3B is an illustration of an image on a photodetector resulting from use of a mask on the reference signal.

A multidithering technique is described in pending U.S. patent application Ser. No. 14/596,960 filed on Jan. 14, 2015, and entitled a "System for Maintaining the Locking Range of an Injection Locked Laser Array Within Range of the Frequency of a Master Laser" by Efimov et al. the contents of which are incorporated herein by reference.

FIG. 1 is a diagram illustrating the formation of an interference pattern useful in understanding the operation of the present invention. There is a difference between 0-phase interference patterns and 0-fringe interference patterns. A 0-phase interference pattern means that the length difference in the optical paths of both beams is equal to 0 and the beams experience a constructive interference with the brightest fringe. Usually this occurs only for some specific direction. However, the same brightness will be observed for any directions where m (i.e. $m=\Delta L/\lambda$, where $\Delta L$ is the difference between the optical paths of the two beams, and $\lambda$ is the wavelength of the coherent light of the two beams) is equal to an integer number. Referring to FIG. 1, L1 is the optical path for a first beam, L2 is the optical path for a second beam, $\Delta L$ is the difference in the lengths of the optical paths of beams and $\lambda$ is the wavelength. Here L1, L2, and $\Delta L$ are measured along the optical axis shown by dashed line in FIG. 1.

FIG. 2 is a diagram of six interference patterns useful in understanding the operation of the present invention. These patterns are the result of the interference of two light beams having 1 μm wavelength produced as shown in FIG. 1. The sizes of the patterns, i.e. the length and width of the patterns illustrated in FIG. 2, are 2 mm×2 mm. The length L1 is 50 mm. The differences in the optical paths of the beams along the optical axis and the phase differences are described in the caption beneath the figure.

In FIG. 2, the interference patterns shown in FIG. 2A and FIG. 2B are for m=20000 µm/1 µm=20000. FIG. 2A has the same highest available intensity as for m=0 (not illustrated). If the phase difference is shifted by π, then the pattern has the lowest intensity. This situation is shown in FIG. 2B, also with m>>0. If the optical path difference is reduced from 20 mm to 6 mm, as shown in FIG. 2C, the number of fringes over the same area (i.e. 2 mm×2 mm), or the spatial frequency of fringes, is reduced. If the optical path difference is further reduced to 2 mm, the spatial frequency of fringes or the number of visible fringes is further reduced as illustrated in FIG. 2D.

If the optical path difference is reduced to zero everywhere on the screen of the photodetector, the same intensity pattern is produced independent of the position of observation on the screen, that is, the spatial frequency of fringes is equal to 0. This is termed the 0-fringe pattern in the remainder of this application. Such patterns are shown in FIG. 2E for $\Delta\varphi=\pi/2$ and in FIG. 2F for $\Delta\varphi=\pi$ phase differences between the beams, respectively. In these figures, the optical path difference $\Delta L=0$ which means that m=0 also. One skilled in the art further understands that a 0-fringe pattern can be implemented with different optics systems for any value of m-number.

FIG. 3A is a block diagram of one embodiment of the present invention and FIG. 3B is an illustration of an image on a photodetector resulting from use of a mask 2 on the reference signal. In FIG. 3A, an array 1 of lasers or laser amplifiers directs beams to the photosensitive area of photodetector 7 by a lens 4. A mask 2, having apertures with shapes, sizes, and positions identical to the shapes, sizes, and positions of beam outputs from array 1, is illuminated with a reference beam 3. The reference beam 3 has a planar wavefront to provide the same phase for all the reference beams developed by the mask 2. The mask 2 is positioned at the same distance from the photodetector 7 as the array 1 and is directed to the photodetector 7 with a lens 5 identical to the lens 4.

The beams from the laser array 1 and the reference beam are coherent. The optical signal supplied to the photodetector 7 is the respective patterns formed by the beams from the array 1 interfering with their corresponding reference beams from the mask 2. The electrical output signal from the photodetector 7 is a composite signal derived from the combination of the respective interference patterns.

One skilled in the art understands that phase modulations may be applied to either the beams in the array 1 or to the respective corresponding reference beams developed by the mask 2. In the remainder of this application, unless specifically described differently, modulations will be illustrated as applied to the respective beams in the array 1.

In operation, the composite signal from the photodetector 7 is supplied to a phase detector 9. The phase detector 9 calculates the respective phase differences between the beams from array 1 and the corresponding reference beams in a manner described in detail below. The phase detector 9 produces respective phase difference signals representing these phase differences. More specifically, in FIG. 3A, 11 phase difference signals are produced corresponding to the 11 beams from the array 1 and the 11 reference beams from the mask 2. These signals may be used, for example, by beam steering apparatus (not germane to this invention, and therefore not illustrated) to correct the phases of the beams in the array in order to steer the array accurately.

FIG. 3B is an illustration of an image on the photodetector 7 detecting surface resulting from use of the mask 2 on the reference signal 3 as illustrated in FIG. 3A. The images from array 1 and mask 2 are combined with each other by beamsplitter 6 to get 0-fringe interference images. These images impinge on the detecting surface of photodetector 7 as shown in FIG. 3B. Because the phases of the beams from array 1 are random in FIG. 3A, the images of interfering beams have different intensities as shown by grayscale in FIG. 3B depending on phase difference between the reference beam 3 and the corresponding beam from array 1. For example, if a beam from array 1 is in phase with the reference beam 3, the resultant combined beams will reinforce and produce a relatively bright image on the detecting surface of photodetector 7, as illustrated by image 7A in FIG. 3B. If a beam from array 1 is π out of phase with the reference beam 3, the resultant combined beams will cancel and produce a relatively dark image on the detecting surface of photodetector 7, as illustrated by image 7B in FIG. 3B.

Figure 4:
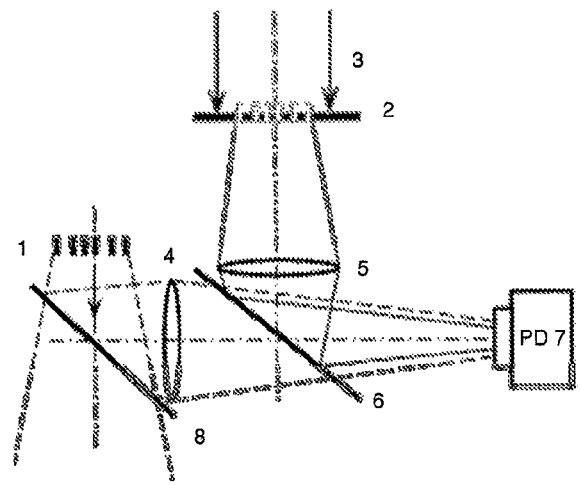
FIG. 4 is a block diagram of a second embodiment of the optics portion only of a system according to principles of the present invention.

FIG. 4 is a block diagram of the optics portion only of a second embodiment of the present invention. In FIG. 4, elements which are the same as those in FIG. 3A are designated by the same reference number and are not described in detail. One skilled in the art understands that it is not necessary to use the total power of array 1 for phase measurements. Instead, a small part of power from the array 1 is sufficient. In FIG. 4, a beam sampler 8 samples a portion of the power of the beams from array 1 for use in detecting phase differences. In FIG. 4, the lens 4 directs this portion of beams from array 1 to the photodetector 7. The remainder of the embodiment illustrated in FIG. 4 operates as described above with reference to FIG. 3A.

Figure 5:
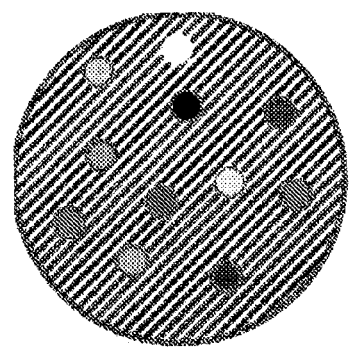
FIG. 5 is an illustration of the image on the photodetector in the absence of a mask.

FIG. 5 is an illustration of the image on the detecting surface of photodetector 7 in the absence of mask 2. The embodiments shown in FIG. 3A or FIG. 4 can be used without a mask 2. Each beam from the array 1 interferes with the reference beam and forms an image on the photodetector 7. However, in this case the total area of the detecting surface of the photodetector 7 is exposed to the power from the reference beam 3. This exposure of the entire photosensitive area decreases the available dynamic range of photodetector 7 and, thus, the number of beams measurable with photodetector 7.

Lens 5 in FIG. 3A or FIG. 4 is required to provide the proper geometrical divergence of the reference beam 3 for 0-fringe interference. More specifically, the divergences of the reference and signal beams should be set to provide less than one interference fringe for every interfering spot on the detecting surface of the photodetector 7 to make measurements possible. Otherwise, in the case of non-0-fringe interference, the signal from such a spot will have rather intensive continuous and small alternating components reducing the available photodetector dynamic range and the accuracy of measurements. In addition, when the reference and signal beams have a relatively strong difference in their powers, equations (1) or (5), below, show that the relative contribution of the alternating phase modulated component in the total signal is decreased. Therefore, preferably the beams from array 1 and the corresponding reference beams transmitted through the mask 2 should have the intensity and divergence relatively the same.

The lenses 4 and 5 in FIG. 3A or FIG. 4 as well as the dimensions of mask 2 and array 1 are not necessarily identical. Different magnifications may be used in the reference and array arms of interferometer. The only requirement is that the images from the array 1 and mask 2 have close sizes and divergences so they overlap accurately on the detecting surface of the photodetector 7.

Referring back to FIG. 3A, the phase detector 9 processes the composite signal from the photodetector 7 to generate respective signals representing the phase differences between the beams from the array 1 and the corresponding reference beams from mask 2. According to the multidithering technique discussed above, one of (a) the array 1 beams and (b) the corresponding reference beams from the mask 2, must be phase modulated at known frequencies $\omega_i$ which are unique, and with a modulation factor $\Gamma_i < \pi$.

For example in one case, a sinusoidal phase modulation is applied to each beam i of the N beams in the array 1 while the N beams from the mask 2 are not modulated (see FIGS. 3E-3F). In a second case, a sinusoidal phase modulation is applied to each separate reference beam i from the mask 2 while the N beams in the array 1 are not modulated (see FIGS. 3C-3D). In both cases each modulated beam i is modulated at a specific unique known frequency $\omega_i$ with a modulation factor $\Gamma_i < \pi$.

The composite signal $V_{PD}(t)$ from photodetector 7, having responsivity $\eta_V$, is given by:

$$V_{PD}(t) = \frac{\eta_V}{2} \sum_{i=1}^{N} \left[ P_i^s + P_i^r + 2\sqrt{P_i^s P_i^r} \cos(\Delta\phi_i + \Gamma_i \sin\omega_i t) \right] \quad (5)$$

where $P_i^s$ and $P_i^r$ are the powers of the $i^{th}$ array 1 beam and the $i^{th}$ reference 3 beam respectively, and $\Delta\phi_i$ is the phase difference between $i^{th}$ array beam and reference beam, $\omega_i$ is the frequency of the modulation of the $i^{th}$ array beam and $\Gamma_i$ is the modulation factor of the $i_{th}$ array beam. By using a Bessel function expansion for the cosine-sine term in equation (5), as described above with respect to equation (2), the following expressions can be obtained:

$$V_{PD}(t) = \frac{\eta_V}{2} \sum_{i=1}^{N} \left\{ \begin{array}{l} P_i^s + P_i^r + 2\sqrt{P_i^s P_i^r} \cos\Delta\phi_i [J_0(\Gamma_i) + 2J_2(\Gamma_i)\cos 2\omega_i t + \ldots ] - \\ 2\sqrt{P_i^s P_i^r} \sin\Delta\phi_i [2J_1(\Gamma_i)\sin\omega_i t + 2J_3(\Gamma_i)\sin 3\omega_i t + \ldots ] \end{array} \right\} \quad (6)$$

or $$V_{PD}(t) = \frac{\eta_V}{2} \sum_{i=1}^{N} \left\{ \begin{array}{l} [P_i^s + P_i^r + 2\sqrt{P_i^s P_i^r} J_0(\Gamma_i)\cos\Delta\phi_i] - \\ [4\sqrt{P_i^s P_i^r} J_1(\Gamma_i)\sin\Delta\phi_i]\sin\omega_i t + \\ [4\sqrt{P_i^s P_i^r} J_2(\Gamma_i)\cos\Delta\phi_i]\cos 2\omega_i t - \\ [4\sqrt{P_i^s P_i^r} J_3(\Gamma_i)\sin\Delta\phi_i]\sin 3\omega_i t + \ldots \end{array} \right\} \quad (7)$$

where $J_n(\Gamma_i)$ are Bessel functions of the first kind of order n with the modulation factor $\Gamma_i$ as argument. Finally, the amplitudes of the first $A(\omega_i)$ and second $A(2\omega_i)$ harmonics can be identified and extracted:

$$A(\omega_i) = 4\sqrt{P_i^s P_i^r} J_1(\Gamma_i) \sin \Delta\phi_i$$

$$A(2\omega_i) = 4\sqrt{P_i^s P_i^r} J_2(\Gamma_i) \cos \Delta\phi_i \quad (8)$$

and the phase difference $\Delta\phi_i$ calculated:

$$\Delta\phi_i = \tan^{-1}\left[ \frac{A(\omega_i)}{A(2\omega_i)} \frac{J_2(\Gamma_i)}{J_1(\Gamma_i)} \right] \quad (9)$$

Thus, by measuring the composite signal of N array 1 beams interfering with corresponding N reference 3 beams and extracting the amplitudes of fundamental and second harmonics for the modulation on the beams, the phases of all the beams from array can be calculated relative to the reference beam.

The total number of beams measurable with a single photodetector depends on the current state of photodetector technology, and parameters of the photodetector. Higher dynamic range means that more optical signals can impinge upon the photodetector without saturating it. Lowering the intensity of the optical images on the photodetector allows for more beams within the dynamic range, but eventually, the intensity is low enough that the photodetector noise becomes a significant factor. A photodetector with a low noise characteristic allows accurate detection and processing of lower intensity optical signals, and therefore more optical signals, to be detected without being overwhelmed by noise.

Further parameters of the photodetector include bandwidth and size. Wider bandwidth allows for higher, and therefore more, modulation frequencies. The more area, the more interference patterns may be simultaneously, and separately, formed on the detecting surface. Currently the number of beams simultaneously measurable on a single photodetector is about 100 per existing broadband detector. As photodetector technology progresses, more beams will become measurable on a single photodetector.

Figure 6:
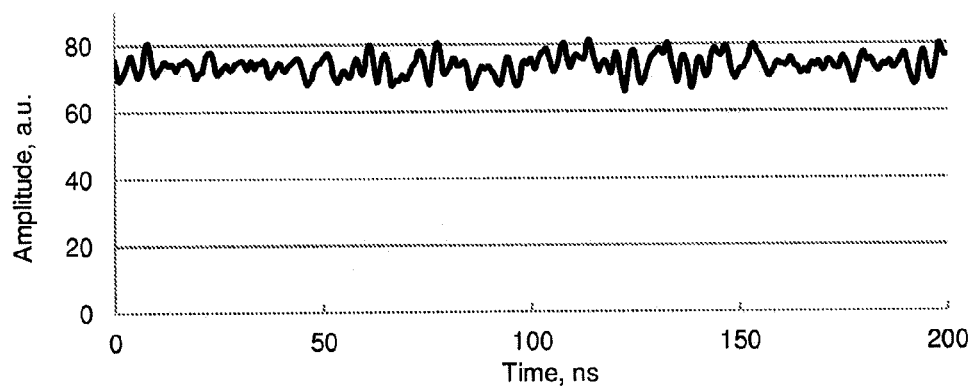
FIG. 6 is a waveform diagram of a simulated composite signal from the photodetector used in simulating the present invention.

A simulation was performed using a simulated signal from a 64 laser array 1 with outputs at a sampling rate of 3 GHz. The modulation factors $\Gamma_i$ were set to random values in the range of $0.25\pi \pm 10\%$. The powers of the reference beams from the mask 2 were set to 1.0 and the powers of the array beams were set to random values in the range of $1.0 \pm 0.2$. The laser outputs were set to random phases in a $2\pi$ interval and modulated at different frequencies. These frequencies were selected to be separable via a digital Fourier transform (DFT). It is well known that to provide an accurate Fourier analysis the minimum spacing between adjacent frequencies must be inversely proportional to the total time of measurement, i.e. the sample time. The simulation was made for 200 ns total time of measurement and modulating frequencies were set to be equally spaced between 5 MHz and 320 MHz. The simulated combined signal produced by photodetector 7 is shown in FIG. 6.

Figure 7A:
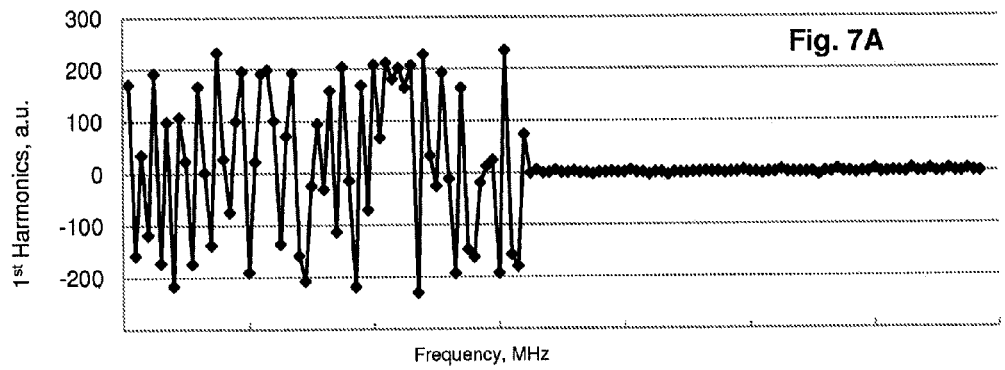
FIG. 7A and FIG. 7B are diagrams illustrating Fourier analyses of the first and second harmonics, respectively, of the simulated composite input signal from a photodetector illustrated in FIG. 6.
Figure 7B:
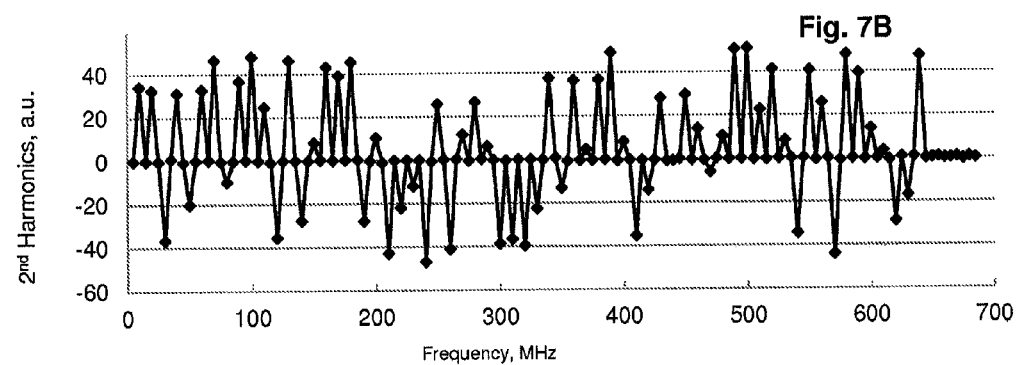

FIG. 7A and FIG. 7B are diagrams illustrating the frequency spectra of a Fourier analyses of the first and second harmonics, respectively, of the composite input signal (FIG. 6) from the photodetector (FIG. 3A: 7). One skilled in the art understands that the lines between the diamonds merely facilitate eye motion and are not part of the DFT output data. The array of phase differences $\Delta\phi_i$ are calculated using equations (5) through (9).

Figure 8:
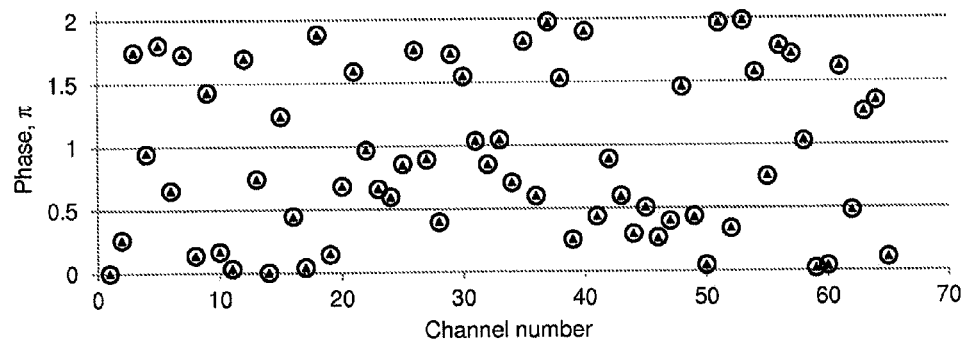
FIG. 8 is a diagram illustrating correspondences of preset phases for an array of laser beams used to fabricate a simulated composite signal to calculated phases for the array of laser beams calculated in response to processing of the simulated composite signal illustrated in FIG. 6 according to principles of the present invention.

FIG. 8 is a diagram illustrating the correspondence of the preset phases for the array of laser beams to calculated phases for the array of laser beams according to principles of the present invention. In FIG. 8, the triangles show the beam phases as preset in the simulation and the circles show the calculated beam phase values. It may be seen that a phase detector according to principles of the present invention provides an accurate reconstruction of phases from the composite signal. The calculated RMS error for all the channels is below 1%. This value of RMS error was calculated for 1 noise in every channel. The RMS error reaches the value of 1% only at 4% noise level in every channel which is high for current photodetectors.

Thus, a phase detector according to principles of the present invention provides very accurate measurements of a large number of individual phases of beams from coherent laser/laser amplifier array with a single photodetector.

The invention claimed is:

1. In a system comprising a source of laser beams forming an array, a source of a reference laser beam, and an optical detector for measuring respective phase differences between the array of laser beams and the reference laser beam, comprising:
- a mask defining apertures therein, wherein the mask is positioned in a path of the reference laser beam to form beams emanating through the mask from the reference laser beam;
- a modulator for modulating the beams of one of (a) the beams of the source of laser beams and (b) the beams of the reference laser beam emanating through the mask;
- a photodetector for receiving the beams from the source of laser beams and the beams of the reference laser beam emanating through the mask to generate a composite signal; and
- processing circuitry responsive to the composite signal for generating respective signals representing the phase differences of the individual laser beams from the reference laser beams emanating through the mask.

2. The system of claim 1 wherein:
the laser beams forming an array are coherent; and
the reference laser beam is coherent with the laser beams forming the array.

3. The system of claim 1,
wherein the modulator is a phase modulator.

4. The system of claim 3 further comprising optics for combining the respective beams from the array with corresponding reference beams emanating from the mask, comprising:
- a first lens arranged in the laser array beams to direct the laser array beams to form respective images on the photodetector; and
- a second lens arranged in the reference beams emanating through the mask to direct the reference beams to form respective images on the photodetector, and for overlapping the images of the laser array beams with the images of reference beams.

5. The system of claim 4 wherein the optics generate images from the respective beams of the laser array and the corresponding reference beams which images are similar in size and divergence.

6. The system of claim 4, wherein:
the beams from the laser array are coherent, and the reference beam is coherent with the beams from the laser array;
the optics overlap respective beams from the laser array with the corresponding reference beams transmitted through the mask to produce an interference pattern; and
the respective reference beams have an intensity and divergence corresponding to those of the beams from the laser array.

7. The system of claim 4 wherein the optics comprise:
a beamsplitter for directing the beams from the laser array and the first lens to form images on the photodetector;
the beamsplitter further aligning the reference beams emanating from the mask and the second lens with beams from the laser array.

8. The system of claim 4 wherein the optics comprise:
a beam sampler for directing the beams from the laser array to the first lens; and
a beam splitter for aligning the respective beams from the mask and the second lens with respective beams from the laser array.

9. The system of claim 3 wherein the processing circuitry comprises:

circuitry responsive to the composite signal from the photodetector for extracting signal components, each component representing a single interference image from a beam from the laser array and a beam from the reference laser on the photodetector; and
circuitry for analyzing each component signal and generating a corresponding signal representing the phase difference between the beam from the laser array and the corresponding reference laser beam.

10. The system of claim 9 wherein:
the phase modulator comprises phase modulators coupled to N beams emanating from one of (a) the laser array and (b) the mask, for phase modulating an $i^{th}$ beam thereof with a predetermined known frequency $\omega_i$ and a modulating factor $\Gamma_i < \pi$;
the composite signal responsive circuitry identifying which beam in the laser array corresponds to the component signals by detecting the frequency $\omega_i$ of the phase modulation of that signal; and
the analyzing circuitry generating the phase difference representative signal, the phase difference representative signal corresponding to the $i^{th}$ beam.

11. The system of claim 3 wherein:
the phase modulator comprises phase modulators coupled to N beams emanating from one of (a) the laser array and (b) the mask, for phase modulating an $i^{th}$ beam thereof with a predetermined known frequency $\omega_i$ and a modulating factor $\Gamma_i < \pi$;
the processing circuitry (1) extracting the signal components using a Fourier transform, and (2) generating the phase difference representative signals in response to the signal components from the Fourier transform.

12. The system of claim 11 wherein the processing circuitry detects the amplitudes of the first $A(\omega_i)$ and second $A(2\omega_i)$ modulation harmonics of each modulated component signal from the Fourier transform and calculates the corresponding phase difference as:

$$\Delta\phi_i = \tan^{-1}\left[\frac{A(\omega_i)}{A(2\omega_i)}\frac{J_2(\Gamma_i)}{J_1(\Gamma_i)}\right]$$

where $\Delta\varphi_i$ is the phase difference between the $i^{th}$ reference beam and the $i^{th}$ beam in the laser array, $A(\omega_i)$ is the amplitude of the first harmonic of the modulation on the $i^{th}$ beam in the laser array, $A(2\omega_i)$ is the amplitude of the second harmonic of the modulation on the $i^{th}$ beam in the laser array, $J_1$ is the Bessel function of the first kind and order 1, $\Gamma_i$ is the $i^{th}$ modulation factor, $J_2$ is the Bessel function of the first kind and order 2.

13. The system of claim 1, wherein the apertures have shapes, sizes, and positions corresponding to shapes, sizes, and positions of the array laser beams.

14. A method for measuring phases of beams from a laser/laser amplifier array relative to a reference beam, comprising:
illuminating a mask defining apertures therein with the reference beam to create reference beams as the reference beam passes through the mask;
modulating one of (a) beams from the array and (b) the reference beams;
combining the beams from the array with the reference beams on a photodetector to generate a signal;
measuring the signal from the photodetector;

calculating the respective beam phases for beams in the array relative to the reference beam in response to the measured signal from the photodetector.

15. The method of claim 14 wherein the calculating step comprises calculating the respective beam phases through Fourier analysis of the measured signal from the photodetector.

16. The method of claim 14, wherein the combining step comprises using part of the power of the respective beams in the array.

17. The method of claim 14, further comprising:
developing the mask defining apertures therein before illuminating the mask defining apertures therein.

18. The method of claim 14 wherein:
the beams from the array are coherent and the reference beam is coherent with the beams from the array; and
the combining step comprises developing combined interference images of the array beams and corresponding reference beams.

19. The method of claim 14, wherein the combining step comprises using different magnifications for the respective beams in the array than corresponding reference beams from the mask.

20. The method of claim 14, wherein the combining step comprises overlapping the respective beams from the array with corresponding reference beams to provide less than one interference fringe for every interfering spot on the photodetector.

21. The method of claim 14 wherein developing the mask defining apertures therein further comprises: developing the mask defining apertures therein with shapes, sizes, and positions corresponding to the shapes, sizes, and positions of the beams in the laser array.

22. The method of claim 14 wherein the modulating is sinusoidal phase modulating.

23. The method of claim 14, wherein combining the array beams with the reference beams on the photodetector further comprises developing combined images.

24. In a system comprising a source of coherent laser beams forming an array, a source of a reference laser beam coherent with the array laser beams, and an optical detector for measuring respective phase differences between the array laser beams and the reference laser beam, comprising:
a mask defining apertures therein and positioned in the reference laser beam to create reference laser beams as the reference beam passes through the mask;
a photodetector receiving the beams from the laser array and the beams from the mask to generate a composite signal; and
processing circuitry responsive to the composite signal from the photodetector for generating respective signals representing the phase differences of the individual laser beams from the reference laser beam.

25. The system of claim 24 further comprising:
a phase modulator for phase modulating beams of one of (a) the beams from the source of the coherent laser beams forming an array and (b) the reference laser beams from the mask.

26. The system of claim 25 wherein the phase modulator is configured for modulating beams of the source of coherent laser beams forming an array; the processing circuitry:
being responsive to the composite signal from the photodetector, and being configured for extracting signal components representing corresponding interference images from beams from the laser array and the reference laser beams emanating through the mask on the photodetector; and the processing circuitry further configured for analyzing each component signal and generating respective signals representing the phase difference between the beams from the laser array and the reference laser beam.

27. The system of claim 26 wherein:
the phase modulator comprises phase modulators coupled to N lasers in the laser array for phase modulating an $i^{th}$ beam in the array with a predetermined known frequency $\omega_i$ and a modulating factor $\Gamma_i < \pi$;
the processing circuitry identifying which beam in the laser array corresponds to the component signals by detecting the frequency $\omega_i$ of the phase modulation of that signal;
the processing circuitry generating a phase difference representative signal corresponding to the $i^{th}$ beam in the array.

28. The system of claim 25 wherein:
the phase modulator is configured for modulating beams of the source of coherent laser beams forming an array;
the phase modulator comprising phase modulators for phase modulating N respective beams in the laser array at equally spaced frequencies between $\omega_1$ and $\omega_N$ with respective modulation factors of $\Gamma_i < \pi$, where $\Gamma_i$ is the modulation factor of an ith beam in the laser array;
the processing circuitry separating the composite signal into component signals using a Fourier transform, and generating the respective phase difference representative signals in response to the component signals from the Fourier transform.

29. The system of claim 28 wherein the processing circuitry detects amplitudes $A(\omega_i)$, $A(2\omega_i)$ of the first and second modulation harmonic respectively of each component signal from the Fourier transform and calculates the phase difference as:

$$\Delta\phi_i = \tan^{-1}\left[\frac{A(\omega_i)}{A(2\omega_i)} \frac{J_2(\Gamma_i)}{J_1(\Gamma_i)}\right]$$

where $\Delta\varphi_i$ is the phase difference between the $i^{th}$ reference beam and the $i^{th}$ beam in the laser array, $A(\omega_i)$ is the amplitude of the first modulation harmonic of the $i^{th}$ beam in the laser array, $A(2\omega_i)$ is the amplitude of the second modulation harmonic of the $i^{th}$ beam in the laser array, $J_1$ is the Bessel function of the first kind, and order 1, $\Gamma_i$ is the $i^{th}$ modulation factor, and $J_2$ is the Bessel function of the first kind, and order 2.

30. The system of claim 24, further comprising optics for forming images on the photodetector, wherein the optics form images of beams from the laser array and the reference laser beams.

31. The system of claim 30 wherein the optics comprise:
a first lens arranged in the laser array beams to direct the beams from the laser array to form images on the photodetector; and
a second lens arranged in the reference beams to direct the beams to form images on the photodetector, thereby overlapping the images of the laser array beams with the images of the reference beams.

32. The system of claim 31, wherein the optics overlap beams from the laser array with the reference beams from the mask to produce interference patterns.

33. The system of claim 31 wherein the optics comprise:
a beamsplitter for directing the beams from the laser array and the first lens to form images on the photodetector, the beamsplitter further for directing the reference beams from the second lens to the photodetector.

34. The system of claim 31 wherein the optics comprise:
a beam sampler for directing a portion of the beams from the laser array to the first lens; and
a beamsplitter for overlapping the reference beams from the second lens with the beams from the laser array.

35. A method for measuring phases of beams from a coherent laser/laser amplifier array relative to a reference beam, comprising:
illuminating a mask defining apertures therein with the reference beam to produce reference beams emanating through the apertures in the mask;
modulating one of (a) the beams in the array of laser beams and (b) the reference laser beams emanating through the apertures in the mask;
combining the array beams with the reference beams on a photodetector to develop a signal;
measuring the signal from the photodetector;
calculating the beam phases for beams in the array relative to the reference beams in response to the measured total signal from the photodetector.

36. The method of claim 35 wherein the calculating step comprises calculating the beam phases through Fourier analysis of the measured total signal from the photodetector.

37. The method of claim 35, wherein the combining step comprises using a part of the power of the beams in the array.

38. The method of claim 35, wherein combining the array of beams with the reference beams on the photodetector further comprises developing interference images.

39. The method of claim 38, wherein the combining step further comprises: developing 0-fringe interference images.

40. The method of claim 35, wherein the modulating step further comprises modulating with sinusoidal phase modulation.

* * * * *